(12) United States Patent
Bartosch

(10) Patent No.: US 12,729,761 B1
(45) Date of Patent: Sep. 8, 2026

(54) METAL CORE CAM FOLLOWER AND METHOD OF ASSEMBLING

(71) Applicant: Intech Powercore Corporation, Closter, NJ (US)

(72) Inventor: Georg Bartosch, Demarest, NJ (US)

(73) Assignee: Intech Powercore Corporation, Closter, NJ (US)

( * ) Notice: Subject to any disclaimer, the term of this patent is extended or adjusted under 35 U.S.C. 154(b) by 0 days.

(21) Appl. No.: 19/434,499

(22) Filed: Dec. 29, 2025

(51) Int. Cl.
*F16H 53/06* (2006.01)

(52) U.S. Cl.
CPC .................................... *F16H 53/06* (2013.01)

(58) Field of Classification Search
CPC ................................. F16H 53/06; F16H 53/08
See application file for complete search history.

(56) References Cited

U.S. PATENT DOCUMENTS 4,938,610 A * 7/1990 Kato ....................... F16C 21/00 384/126
6,109,796 A * 8/2000 Wershe ................ F16C 13/006 280/11.221
10,274,013 B2 * 4/2019 Pallini .................. F16C 13/006
10,458,468 B2 * 10/2019 Malychok ............... F16C 19/38
10,697,493 B2 * 6/2020 Malychok ............... F16C 19/54
10,731,743 B2 * 8/2020 Prescavage ........... F16C 33/783
11,578,791 B1 2/2023 Bartosch
2008/0011119 A1 1/2008 Bartosch

* cited by examiner

*Primary Examiner* — Adam D Rogers
(74) *Attorney, Agent, or Firm* — Forge IP, PLLC

(57) ABSTRACT

A cam follower includes a shaft and a metal core, preferably made from aluminum, with a substantially cylindrical through bore extending between first and second axial core ends, the through bore having an annular shoulder extending inwardly from an interior surface thereof at a position between the first and second axial core ends. At least two bearing assemblies are disposed in the through bore, at least one of which being disposed on one side of the shoulder and at least one other of which being disposed on an opposite side of the shoulder. The bearing assemblies are disposed over the shaft such that the metal core is rotatable with respect to the shaft via the bearing assemblies. A tire is affixed to an outer peripheral surface of the metal core and rotatable with the metal core with respect to the shaft, the tire being formed from a polymeric material.

20 Claims, 4 Drawing Sheets

METAL CORE CAM FOLLOWER AND METHOD OF ASSEMBLING

FIELD OF THE INVENTION

The present invention relates generally to a cam follower, and more particularly to a metal core cam follower exhibiting improved heat dissipation, an even distribution of forces, increased life and simplified assembly.

BACKGROUND OF THE INVENTION

Cams and cam followers are used for a variety of purposes, such being employed by high-speed necker machines used during the manufacture of aluminum cans for containing beverages or the like. Traditional cam followers have been made of metal in order to provide the structural integrity needed to withstand repeated and potentially substantial loads. However, cam and cam follower wear, particularly on necker machines, has always been an issue. The high frequency of repeated metal on metal impact, generated by extrusion forces, spindle weight and associated acceleration force, cause a deterioration of the surfaces, which leads to wear. Other wear accelerating factors include skidding of the cam follower on the cam caused by over-greasing, heavy spring load used on high-speed necker machines and up-and-down sliding of the cam followers (lift) when the spindle is worn out. While the cam usually has a heavy dose of grease on the surface, the lubrication can only go so far to prevent wear.

As the cam followers contact the cam, the metal of the cam followers, as well as the metal of the cam, become worn and both the cam followers and the cam need to be replaced. The replacement of the cam and the cam followers requires a prolonged down time, and consequently involves significant direct and indirect costs. Reducing the cam and cam follower wear becomes more important with increasing line speeds, as the traditional metal components cause disproportionate rise in maintenance and downtime costs.

Attempts have been made to alleviate some of these issues by providing lubrication systems that continuously replenish lubricants supplied to the cam followers via a series of supply tubes or the like. However, it should be recognized that some complex necker systems can include a significant number of cam followers (sometimes more than 700), such that lubrication systems often require a complex web of tubes, which can be prone to failure and possible leaking, particularly as temperatures increase and lubricants become less viscous. Even disregarding these possible contamination issues, lubrication systems necessarily involve routine maintenance costs, and require regular monitoring and refilling.

In order to remedy various of these problems associated with metal cams and cam followers, self-lubricating polymer cam followers have more recently been employed. These cam followers, which essentially eliminate both cam wear and the need for lubrication, have been constructed with at least two precision ball bearing assemblies, which bearing assemblies are lubricated for life, surrounded by a precision machined polymer tire. These cam followers present a very low rolling resistance, exhibit long wear life, absorb shock during impact on the cam, are approximately 35% lighter compared to metal cam followers and do not wear the cam surface. However, these cam followers may suffer from disadvantages of their own.

More specifically, due to the inherent thermally insulating properties of the polymer materials, the use of polymer tires can lead to localized heating of the bearings, since heat dissipation via the tire is reduced, as compared to metal tires. Similarly, polymer tires may be subject to more localized force concentrations, since the polymer tires may not distribute forces as evenly as do metal tires.

Additionally, the use of machined polymer tires may lead to a lengthy and/or complicated cam follower assembly process, involving the following steps: (1) heating the plastic tire to cause expansion thereof; (2) inserting the bearings into the heated tire; (3) allowing the heated tire to cool (sometimes even overnight); (4) inserting the shaft through the bearings; and (5) riveting the shaft onto the bearings. The heating and cooling processes employed when polymer tires are used, in particular, can lead to significantly increased cam follower assembly times, as compared to employing metal tires, where no heating/cooling steps are necessary.

The present invention, therefore, aims to provide a cam follower, such as may be employed by high-speed necker machines used during the manufacture of aluminum cans for containing beverages or the like, with the attendant benefits of employing a polymer tire as compared to employing an entirely metal tire (e.g., reduced or no requirement for lubrication on the cam or the bearings, reduced or no cam wear, low rolling resistance, exhibit long wear life of the cam follower, shock absorption during impact on the cam, and reduced weight), while at the same time exhibiting improved heat dissipation, improved force distribution and reduced assembly time as compared to employing an entirely polymer tire.

SUMMARY OF THE INVENTION

In accordance with one aspect of the present invention, a cam follower includes a shaft extending from a first axial shaft end to a second axial shaft end and a metal core having a first axial core end and a second axial core end with a substantially cylindrical through bore extending between the first axial core end and the second axial core end, the generally cylindrical through bore having an annular shoulder extending inwardly from an interior surface thereof at a position between the first and second axial core ends such that the annular shoulder defines a first through bore section opening toward the first axial core end and a second through bore section opening toward the second axial core end, the metal core further defining an outer peripheral surface. At least two bearing assemblies are disposed in the through bore of the metal core, at least one of the at least two bearing assemblies being disposed in the first through bore section of the metal core, and at least one other of the at least two bearing assemblies being disposed in the second through bore section of the metal core. The at least two bearing assemblies are disposed over the first axial shaft end such that the metal core is rotatable with respect to the shaft via the at least two bearing assemblies. A tire is affixed to the outer peripheral surface of the metal core and rotatable with the metal core with respect to the shaft, the tire being formed from a polymeric material.

In some embodiments, the cam follower further includes a spacer disposed on the shaft between the least one of the at least two bearing assemblies disposed in the first through bore section of the metal core and the at least one other of the at least two bearing assemblies disposed in the second through bore section of the metal core. In certain of these embodiments, the spacer has an axial width substantially equal to an axial width of the annular shoulder extending inwardly from the interior surface of the metal core.

In some embodiments, the at least two bearing assemblies comprises at least three bearing assemblies. In certain of these embodiments, at least two bearing assemblies of the at least three bearing assemblies are disposed in at least one of the first through bore section of the metal core and the second through bore section of the metal core. In certain embodiments, two bearing assemblies are disposed the first through bore section of the metal core and a single bearing assembly is disposed in the second through bore section of the metal core.

In some embodiments, the metal core is formed from aluminum. In some embodiments, the second axial shaft end comprises a fastener adapted to attach the shaft to another component. In certain of these embodiments, the fastener of the second axial shaft end comprises a threaded portion.

In some embodiments, the tire is formed from a polyamide material. In some embodiments, the first axial shaft end comprises a crimp adapted to retain the at least two bearing assemblies, the metal core and the tire on the shaft.

In accordance with another aspect of the present invention, a method of assembling a cam follower includes the steps of:

(i) providing a tire formed from a polymeric material and having a metal core with a first axial core end and a second axial core end with a substantially cylindrical through bore extending between the first axial core end and the second axial core end, the generally cylindrical through bore having an annular shoulder extending inwardly from an interior surface thereof at a position between the first and second axial core ends such that the annular shoulder defines a first through bore section opening toward the first axial core end and a second through bore section opening toward the second axial core end, the metal core further defining an outer peripheral surface;

(ii) inserting at least one first bearing assembly into the first through bore section of the metal core from first axial core end;

(iii) inserting at least one second bearing assembly into the second through bore section of the metal core from second axial core end;

(iv) providing a shaft extending from a first axial shaft end to a second axial shaft end, and disposing the at least one first bearing assembly and the at least one second bearing assembly over the first axial shaft end such that the metal core and the tire are rotatable with respect to the shaft via the at least two bearing assemblies; and (v) crimping the first axial shaft end so as to retain the at least one first bearing assembly, the at least one second bearing assembly, the metal core and the tire on the shaft.

In some embodiments, the method further includes the step of disposing a spacer between the at least one first bearing assembly and the at least one second bearing assembly prior to the step of disposing the at least one first bearing assembly and the at least one second bearing assembly over the first axial shaft end. In certain of these embodiments, the spacer has an axial width substantially equal to an axial width of the annular shoulder extending inwardly from the interior surface of the metal core.

In some embodiments, the at least one first bearing assembly comprises two bearing assemblies. In certain of these embodiments, the at least one second bearing assembly comprises a single bearing assembly.

In some embodiments, the metal core is formed from aluminum. In some embodiments, the tire is formed from a polyamide material. In some embodiments, the method further includes the step of machining at least one of the tire and the shaft.

In accordance with another aspect of the present invention, a cam follower includes a shaft extending from a first axial shaft end to a second axial shaft end and a metal core having a first axial core end and a second axial core end with a substantially cylindrical through bore extending between the first axial core end and the second axial core end, the generally cylindrical through bore having an annular shoulder extending inwardly from an interior surface thereof at a position between the first and second axial core ends such that the annular shoulder defines a first through bore section opening toward the first axial core end and a second through bore section opening toward the second axial core end, the metal core further defining an outer peripheral surface. At least three bearing assemblies are disposed in the through bore of the metal core, at least two of the at least three bearing assemblies being disposed in the first through bore section of the metal core, and at least one other of the at least three bearing assemblies being disposed in the second through bore section of the metal core. A spacer is disposed between the least two of the at least three bearing assemblies disposed in the first through bore section of the metal core and the at least one other of the at least three bearing assemblies disposed in the second through bore section of the metal core, the spacer having an axial width substantially equal to an axial width of the annular shoulder extending inwardly from the interior surface of the metal core. The at least three bearing assemblies and the spacer are disposed over the first axial shaft end such that the metal core is rotatable with respect to the shaft via the at least three bearing assemblies and the first axial shaft end comprises a crimp adapted to retain the at least three bearing assemblies, the spacer and the metal core on the shaft. A tire is affixed to the outer peripheral surface of the metal core and rotatable with the metal core with respect to the shaft, the tire being formed from a polyamide material.

In some embodiments, the metal core is formed from aluminum.

Other features and advantages of the invention will become more apparent from consideration of the following drawings.

DETAILED DESCRIPTION OF THE INVENTION

Figure 1:
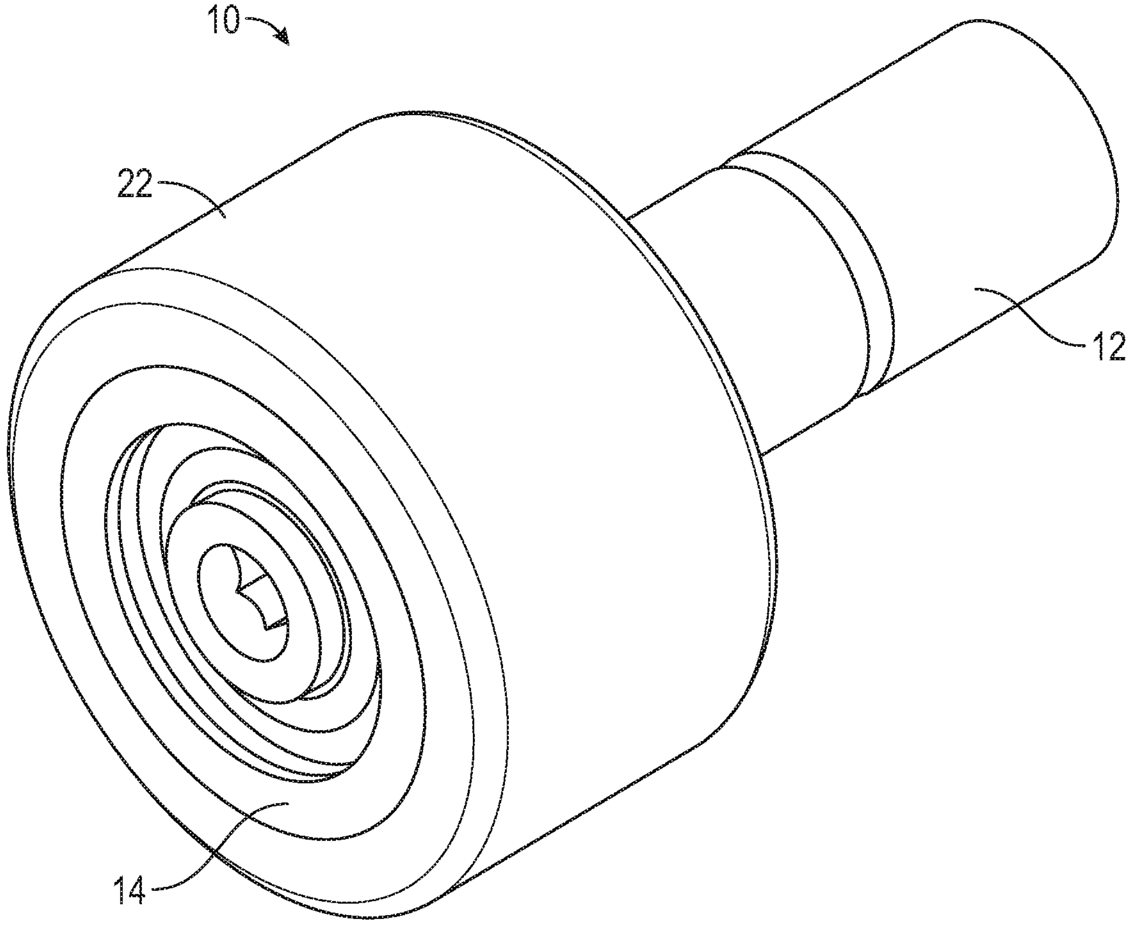
FIG. 1 is a side isometric view of a metal core cam follower in accordance with an exemplary embodiment of the present invention.

The present invention may be further understood with reference to the following description and the appended drawings, wherein like elements are referred to with the same reference numerals. Exemplary embodiments of the present invention describe metal core cam followers in necker applications. It should be understood, however, that the present invention may be implemented in any camming arrangement that utilizes or may utilize a cam follower having a polymeric outer tire periphery. Indeed, the metal core cam follower of the present invention is suitable for any application where a polymeric cam follower may be used, subject to the environmental capabilities of the materials being used.

Figure 2:
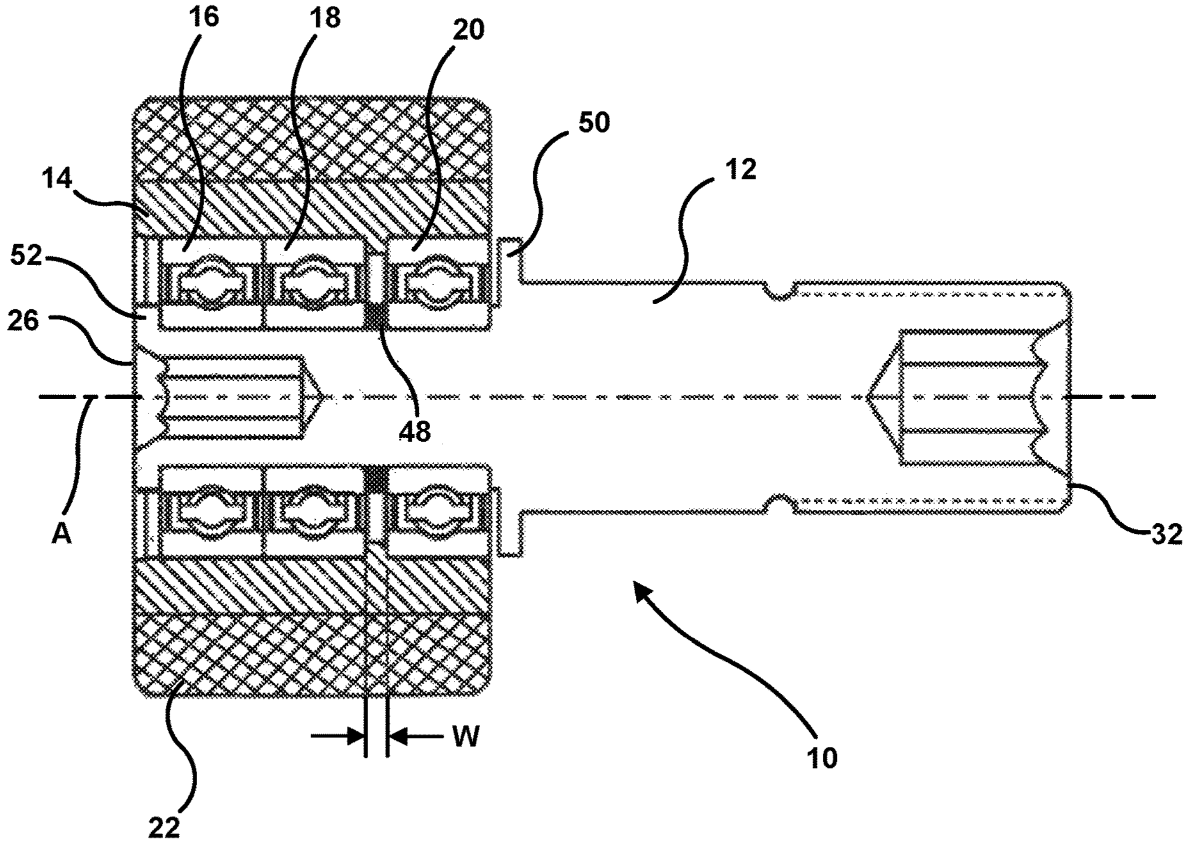
FIG. 2 is a side partially cross-sectional view of the metal core cam follower of FIG. 1.

As shown in FIGS. 1 and 2, the metal core cam follower (10) of the present invention generally includes a shaft (12), a core (14) rotatable about the shaft (12) via three ball bearing assemblies (16, 18, 20), and a tire (22) affixed to the core (14) and rotatable with the core (14) about the shaft (12). Each of these elements, along with their configuration and operation, will be described in more detail below.

Figure 4A:
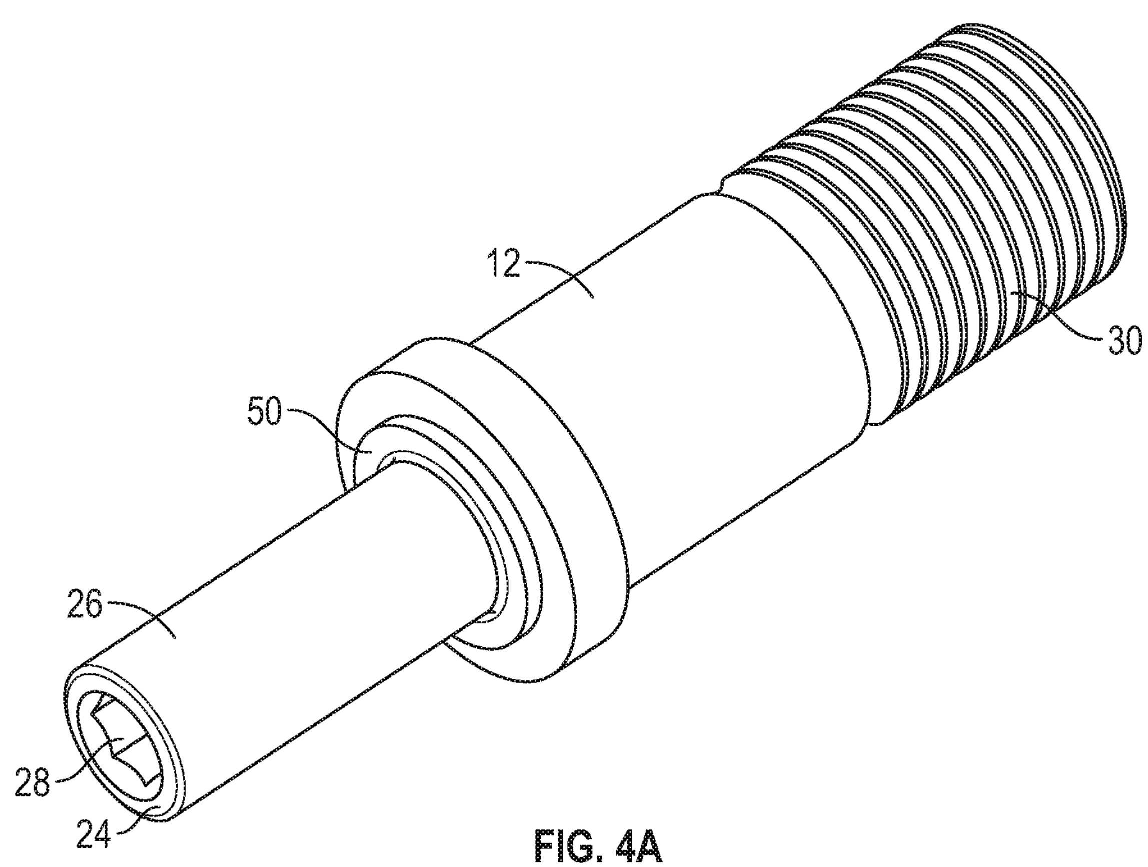
FIGS. 4A and 4B are, respectively, side isometric and side elevational views of a shaft portion of the metal core cam follower of FIGS. 1 and 2.
Figure 4B:
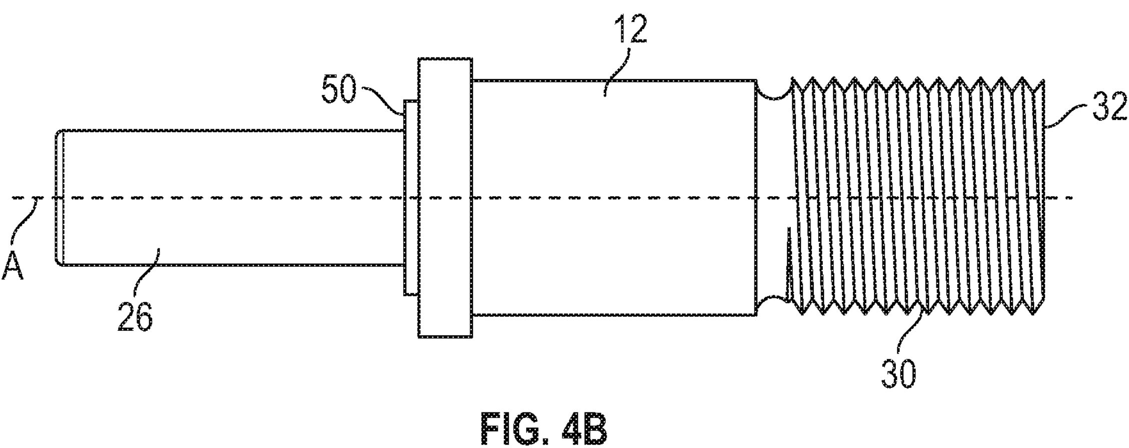

As best seen in FIGS. 2, 4A and 4B, the shaft (12) includes a face (24) at the first axial end (26) thereof perpendicular to an axis of rotation (A) of the flanged cam follower (10). The face (24) has a recessed hexagonal socket (28) configured to receive a hex wrench, or the like, for rotating the shaft (12) about the axis of rotation (A). The shaft (12) further includes a plurality of threads (30) on a circumferential outside surface of the shaft (12) at the second axial end (32) thereof. In this way, the shaft (12) can be received in a bore (not shown) comprising a complementary thread pattern or can similarly be received in a nut or the like having a complementary thread pattern. If desired, the shaft (12) may optionally also include a hollow portion (not shown) to allow for weight reduction of the shaft (12) for efficiency of operation.

Figure 3:
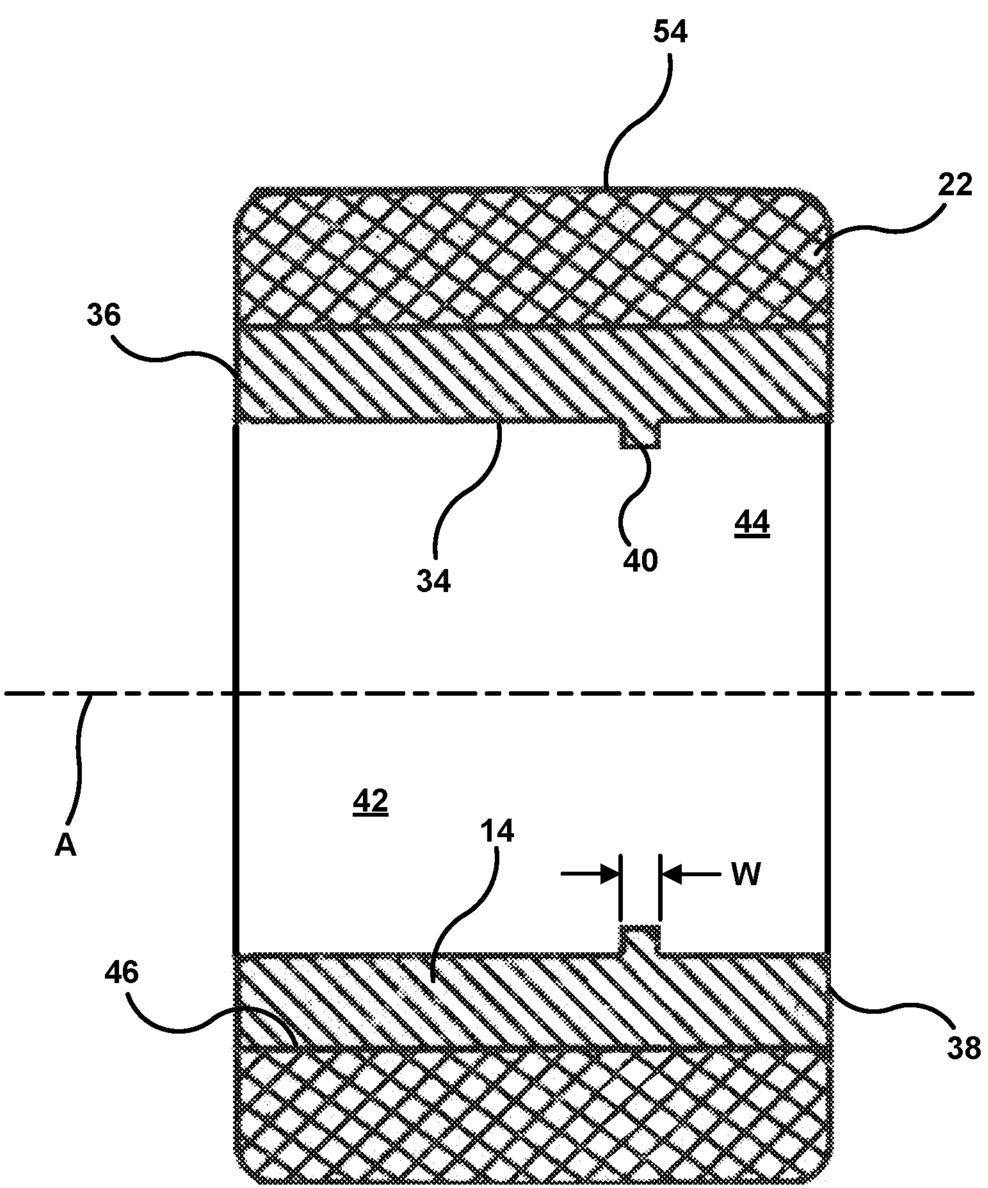
FIG. 3 is a side partially cross-sectional view of metal core and tire portions of the metal core cam follower of FIGS. 1 and 2.

Referring now to FIG. 3 in addition to FIGS. 1 and 2, the metal core (14) defines a generally cylindrical through bore (34) extending between a first axial core end (36) and a second axial core end (38) with the ball bearing assemblies (16, 18, 20) disposed therein, as best seen in FIG. 2. The generally cylindrical through bore (34) has an annular shoulder (40) extending inwardly from an interior surface thereof at a position part-way between the first and second axial core ends (36, 38) such that the annular shoulder (40) defines a first through bore section (42) opening toward the first axial core end (36) and a second through bore section (44) opening toward the second axial core end (38). The metal core further defines an outer peripheral surface (46).

In the illustrated embodiment, two of the bearing assemblies (16, 18) are disposed in the first through bore section (42) of the metal core (14), while one of the bearing assemblies (20) is disposed in the second through bore section (44) of the metal core (14), with the annular shoulder (40) separating the bearing assembly (18) and the bearing assembly (20). As seen in FIG. 2, a spacer (48) is also disposed between the bearing assembly (18) and the bearing assembly (20). The spacer (48) and the annular shoulder (40) have substantially the same widths (W), so as to ensure an even spacing between the inner and outer bearing rings of the bearing assemblies (18, 20).

During assembly, the ball bearing assembles (16, 18) are inserted into the first through bore section (42) of the metal core (14) from first axial core end (36) (i.e., from the left with respect to the orientation shown in FIG. 2) and moved toward the right until the ball bearing assembly (18) abuts the annular shoulder (40). Similarly, the ball bearing assembly (20) is inserted into the second through bore section (44) of the metal core (14) from second axial core end (38) (i.e., from the right with respect to the orientation shown in FIG. 2) and moved toward the left until the ball bearing assembly (20) abuts the annular shoulder (40). The spacer (48) may be inserted from either the first or second axial core end (36, 38) prior to the corresponding bearing assembly/assemblies being inserted from that end. While three ball bearing assemblies (16, 18, 20) are shown, a smaller or larger number of ball bearing assemblies may be employed instead, so long as there is at least one ball bearing assembly provided in each of the first through bore section (42) and the second through bore section (44). Moreover, other types of bearing assemblies, such as roller bearings, may be used in addition to, or instead of, ball bearing assemblies.

The ball bearing assemblies (16, 18, 20) are disposed over the first axial end (26) of the shaft (12) such that the metal core (14) is rotatable with respect to the shaft (12) via the ball bearing assemblies (16, 18, 20). The ball bearing assemblies (16, 18, 20), the spacer (48) and consequently the metal core (14), may be axially retained on the shaft (12) by provision of a shoulder (50) on the shaft (12) which abuts ball bearing assembly (20). Once the ball bearing assemblies (16, 18, 20), the spacer (48) and the metal core (14) are in position on the shaft (12), a crimp (52) may be formed at the first axial end (26) of the shaft (12) (best seen in FIG. 2) abutting ball bearing assembly (16), thereby retaining the assembly defined by the ball bearing assemblies (16, 18, 20), the spacer (48) and the metal core (14) rotatably on the shaft (12). It should be recognized that instead of a crimp, some other retention mechanism, such as another shoulder, flange, retaining clip or the like, may be employed.

The metal core (14) is preferably formed from a metal that provide robust structural support, as well as advantageous heat dissipation properties. Aluminum has been found to provide these desirable characteristics, as well as to be relatively light-weight, thereby proving to be an excellent choice. In some situations, stainless steel or other non-reactive metals may be desirable, particularly for use in corrosive environments.

As noted above, the metal core (14) further defines an outer peripheral surface (46) which may, in some embodiments, be generally cylindrical. Such is not strictly necessary however, and if desired, the outer peripheral surface (46) may have other shapes, such as being polygonal, frustoconical, etc.

Again referring to FIGS. 1 and 2, a polymeric tire (22) is affixed to the outer peripheral surface (46) of the metal core (14), such that the polymeric tire (22) is rotatable with the metal core (14) with respect to the shaft (12), the polymeric tire (22) defining a generally cylindrical outer surface (54). In certain situations, it is desirable for the polymeric tire (22) to be formed from a polyamide material, such as a nylon. Various methods may be employed for forming the polymeric tire (22), such as machining the tire (22) from a monolithic piece of polyamide material or casting the tire (22) around the metal core (14).

The polymeric tire (22) may be affixed to the outer peripheral surface (46) of the metal core (14) by various means, such as by friction fit, by application of adhesives, by ultrasonic welding, by direct molding or casting, etc. In order to enhance the bond between the polymeric tire (22) and the metal core (14), the outer peripheral surface (46) of the metal core (14) may have protrusions, recesses or both protrusions and recesses provided thereon in order to enhance attachment of the polymeric tire (22) to the metal core (14). As one specific example, the outer peripheral surface (46) of the metal core (14) may be knurled in order to enhance attachment of the polymeric tire (22) to the metal core (14).

Provision of a metal core (14) provides several advantages over an all polymer design, including the following: a metal core (14) supports the polymeric tire (22) on the entire length thereof and evenly distributes the radial load to the ball bearings (16, 18, 20), which translates into higher load-bearing capacity; a metal core (14) provides improved dissipation of localized heat created in the bearing assemblies (16, 18, 20) due to its advantageous heat transfer properties as compared to an all-polymer tire assembly; and a metal core (14) allows for reduced assembly time as compared to employing an entirely polymer tire, since there is no requirement for heating/cooling of a polymer in order to insert the bearing assemblies (16, 18, 20).

At the same time, provision of a polymeric tire (22) also provides several advantages, including the following: no lubrication is required on the cam, the cam follower or the bearings (bearings are lubricated for life); there is substantially no cam wear, which results in substantial savings on replacing worn-out cams (e.g., on necker machines); with a polymeric tire (22), there is no grease and metal particulate contamination; a polymeric tire (22) reduces rolling resistance, as compared to metal cam followers; and a polymeric tire (22) provides for shock absorption during impact on the cam as compared to employing an entirely metal tire.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A cam follower comprising:

a shaft extending from a first axial shaft end to a second axial shaft end;

a metal core having a first axial core end and a second axial core end with a substantially cylindrical through bore extending between the first axial core end and the second axial core end, the substantially cylindrical through bore having an annular shoulder extending inwardly from an interior surface thereof at a position between the first and second axial core ends such that the annular shoulder defines a first through bore section opening toward the first axial core end and a second through bore section opening toward the second axial core end, said metal core further defining an outer peripheral surface;

at least three bearing assemblies disposed in the through bore of said metal core, wherein at least one of said at least three bearing assemblies is disposed in the first through bore section of said metal core, and wherein at least one other of said at least three bearing assemblies is disposed in the second through bore section of said metal core, said at least three bearing assemblies being disposed over the first axial shaft end such that said metal core is rotatable with respect to said shaft via said at least three bearing assemblies; and a tire affixed to the outer peripheral surface of said metal core and rotatable with said metal core with respect to said shaft, said tire being formed from a polymeric material.

2. The cam follower of claim 1 further comprising a spacer disposed on said shaft between the least one of said at least three bearing assemblies disposed in the first through bore section of the metal core and the at least one other of said at least three bearing assemblies disposed in the second through bore section of said metal core.

3. The cam follower of claim 2 wherein said spacer has an axial width substantially equal to an axial width of the annular shoulder extending inwardly from the interior surface of said metal core.

4. The cam follower of claim 1 wherein at least two bearing assemblies of the at least three bearing assemblies are disposed in at least one of the first through bore section of said metal core and the second through bore section of said metal core.

5. The cam follower of claim 4 wherein two bearing assemblies of the at least three bearing assemblies are disposed in the first through bore section of said metal core and a single bearing assembly of the at least three bearing assemblies is disposed in the second through bore section of said metal core.

6. The cam follower of claim 1 wherein said metal core is formed from aluminum.

7. The cam follower of claim 1 wherein the second axial shaft end comprises a fastener adapted to attach said shaft to another component.

8. The cam follower of claim 7 wherein the fastener of the second axial shaft end comprises a threaded portion.

9. The cam follower of claim 1 wherein said tire is formed from a polyamide material.

10. A cam follower comprising:

a shaft extending from a first axial shaft end to a second axial shaft end;

a metal core having a first axial core end and a second axial core end with a substantially cylindrical through bore extending between the first axial core end and the second axial core end, the substantially cylindrical through bore having an annular shoulder extending inwardly from an interior surface thereof at a position between the first and second axial core ends such that the annular shoulder defines a first through bore section opening toward the first axial core end and a second through bore section opening toward the second axial core end, said metal core further defining an outer peripheral surface;

at least two bearing assemblies disposed in the through bore of said metal core, wherein at least one of said at least two bearing assemblies is disposed in the first through bore section of said metal core, and wherein at least one other of said at least two bearing assemblies is disposed in the second through bore section of said metal core, said at least two bearing assemblies being disposed over the first axial shaft end such that said metal core is rotatable with respect to said shaft via said at least two bearing assemblies; and a tire affixed to the outer peripheral surface of said metal core and rotatable with said metal core with respect to said shaft, said tire being formed from a polymeric material;

wherein the first axial shaft end comprises a crimp adapted to retain said at least two bearing assemblies, said metal core and said tire on said shaft.

11. A method of assembling a cam follower comprising the steps of:

providing a tire formed from a polymeric material and having a metal core with a first axial core end and a second axial core end with a substantially cylindrical through bore extending between the first axial core end and the second axial core end, the substantially cylindrical through bore having an annular shoulder extending inwardly from an interior surface thereof at a position between the first and second axial core ends such that the annular shoulder defines a first through bore section opening toward the first axial core end and a second through bore section opening toward the second axial core end, the metal core further defining an outer peripheral surface;

inserting at least one first bearing assembly into the first through bore section of the metal core from the first axial core end;

inserting at least one second bearing assembly into the second through bore section of the metal core from the second axial core end;

providing a shaft extending from a first axial shaft end to a second axial shaft end, and disposing the at least one first bearing assembly and the at least one second bearing assembly over the first axial shaft end such that the metal core and the tire are rotatable with respect to the shaft via the at least two bearing assemblies; and crimping the first axial shaft end so as to retain the at least one first bearing assembly, the at least one second bearing assembly, the metal core and the tire on the shaft.

12. The method of claim 11 further comprising the step of disposing a spacer between the at least one first bearing assembly and the at least one second bearing assembly prior to said step of disposing the at least one first bearing assembly and the at least one second bearing assembly over the first axial shaft end.

13. The method of claim 12 wherein the spacer has an axial width substantially equal to an axial width of the annular shoulder extending inwardly from the interior surface of the metal core.

14. The method of claim 11 wherein the at least one first bearing assembly comprises two bearing assemblies.

15. The method of claim 14 wherein the at least one second bearing assembly comprises a single bearing assembly.

16. The method of claim 14 wherein the metal core is formed from aluminum.

17. The method of claim 11 wherein the tire is formed from a polyamide material.

18. The method of claim 17 further comprising the step of machining at least one of the tire and the shaft.

19. A cam follower comprising:

a shaft extending from a first axial shaft end to a second axial shaft end;

a metal core having a first axial core end and a second axial core end with a substantially cylindrical through bore extending between the first axial core end and the second axial core end, the substantially cylindrical through bore having an annular shoulder extending inwardly from an interior surface thereof at a position between the first and second axial core ends such that the annular shoulder defines a first through bore section opening toward the first axial core end and a second through bore section opening toward the second axial core end, said metal core further defining an outer peripheral surface;

at least three bearing assemblies disposed in the through bore of said metal core, wherein at least two of said at least three bearing assemblies is disposed in the first through bore section of said metal core, and wherein at least one other of said at least three bearing assemblies is disposed in the second through bore section of said metal core;

a spacer disposed between the least two of said at least three bearing assemblies disposed in the first through bore section of the metal core and the at least one other of said at least three bearing assemblies disposed in the second through bore section of said metal core, said spacer having an axial width substantially equal to an axial width of the annular shoulder extending inwardly from the interior surface of said metal core;

wherein said at least three bearing assemblies and said spacer are disposed over the first axial shaft end such that said metal core is rotatable with respect to said shaft via said at least three bearing assemblies and wherein the first axial shaft end comprises a crimp adapted to retain said at least three bearing assemblies, said spacer and said metal core on said shaft; and a tire affixed to the outer peripheral surface of said metal core and rotatable with said metal core with respect to said shaft, said tire being formed from a polyamide material.

20. The cam follower of claim 19 wherein said metal core is formed from aluminum.

* * * * *